United States Patent [19]

Peise et al.

[11] Patent Number: 5,248,316
[45] Date of Patent: Sep. 28, 1993

[54] DEVICE FOR GASIFYING MATERIALS THAT CONTAIN CARBON

[75] Inventors: Helmut Peise; Wolfgang Heinrich; Klaus Lucas; Jürgen Görz, all of Freiberg; Manfred Förster, Essen; Muharrem Kilicaslan, Voerde, all of Fed. Rep. of Germany

[73] Assignees: Deutsche Babcock Energie- und Umwelttechnik AG, Oberhausen; Deutsches Brennstoffinstitut GmbH, Freiberg, Fed. Rep. of Germany

[21] Appl. No.: 703,882

[22] Filed: May 22, 1991

[30] Foreign Application Priority Data

May 29, 1990 [DE] Fed. Rep. of Germany ....... 4017219

[51] Int. Cl.⁵ .............................................. C10J 3/48
[52] U.S. Cl. .......................................... 48/76; 48/67; 122/6 A
[58] Field of Search .................. 48/62 R, 63, 64, 76, 48/77, 69, 127.9; 122/5, 6 A, 7 R; 55/269

[56] References Cited

U.S. PATENT DOCUMENTS

| | | | |
|---|---|---|---|
| 4,272,255 | 6/1981 | Coates | 48/67 |
| 4,343,626 | 8/1982 | Peise et al. | 48/67 |
| 4,395,268 | 7/1983 | Zabelka | 122/7 R |
| 4,437,864 | 3/1984 | Gorris et al. | 48/67 |
| 4,554,967 | 11/1985 | Johnson et al. | 122/6 A |
| 4,707,163 | 11/1987 | Gudymov et al. | 48/67 |
| 4,768,470 | 9/1988 | Ziegler | 122/7 R |
| 4,813,382 | 3/1989 | Lindermann et al. | 48/69 |
| 4,818,252 | 4/1989 | Kohnen et al. | 122/6 A |
| 4,818,253 | 4/1989 | Kohnen et al. | 48/67 |
| 4,848,982 | 7/1989 | Tolle et al. | 55/269 |

FOREIGN PATENT DOCUMENTS 1-236895 10/1986 Japan .................. 48/62 R

*Primary Examiner*—Peter Kratz
*Attorney, Agent, or Firm*—Max Fogiel

[57] ABSTRACT

A reactor (7) for gasifying materials that contain carbon under pressure has a tube wall (20) that has coolant flowing through it and is lined with a refractory material (21). The outlet (9) from the reactor (7) points down and opens into a cooler (10). The reactor is accommodated in a pressurized vessel (1) along with the cooler (10) and can be released and removed independently.

8 Claims, 2 Drawing Sheets

DEVICE FOR GASIFYING MATERIALS THAT CONTAIN CARBON

BACKGROUND OF THE INVENTION

The invention concerns a device for gasifying fine-grained, liquid, or gaseous materials that contain carbon.

A gasification plant of this type is known from European Patent 24 281. It is distinguished by its compactness, effective cooling, and general availability. The gas it produces contains constituents that severely corrode the steels conventionally employed for boiler tubes. This corrosion increases with the pressure at the gas end and with the temperature of the wall of the tubing. Although corrosion-resistant materials do counteract precocious corrosion, they can be expensive. It would accordingly be desirable to provide means of maintaining the gasification reactor and cooler. The system described in the aforesaid European patent does not address such means.

Accommodating the gasification reactor and the cooler in a gasification system in separate pressurized vessels connected by a transfer line or flange is known. A known pressurized gasification reactor (DD Patent 145 181) consists of a multiply looped coil embedded in a refractory material. This reactor is accommodated in and can be removed from the vessel in one piece. Nitrogen flows through the space between the gasification reactor and the vessel to prevent steam from cooling below its condensation point and condensing out of the product.

A heat exchanger for cooling gasification products is known from German OS 3 406 893. This heat exchanger is a convection-operated cooler and comprises a pressurized vessel with an insert made of cooled tubing-slab walls resting in it. Flue surfaces inside the insert are suspended from the vessel and can be removed.

SUMMARY OF THE INVENTION

Although separating the gasification reactor from the cooler does facilitate access and disassembly of the various subassemblies, it makes the overall system more expensive. The object of the present invention is accordingly to make a pressurized system consisting of a gasification reactor and cooler easier to maintain but not more expensive.

This object is attained in accordance with the invention by the characteristics recited in the body of claim 1. Advantageous embodiments of the invention are recited in the subsidiary claims.

The device in accordance with the invention is distinguished in that, although both the gasification reactor and the cooler are accommodated in the same pressurized vessel, which makes the system comparatively inexpensive, each component can be removed separately for maintenance.

BRIEF DESCRIPTION OF THE DRAWINGS

One embodiment of the invention will now be specified with reference to the drawing, wherein.

DESCRIPTION OF THE PREFERRED EMBODIMENTS

Figure 1:
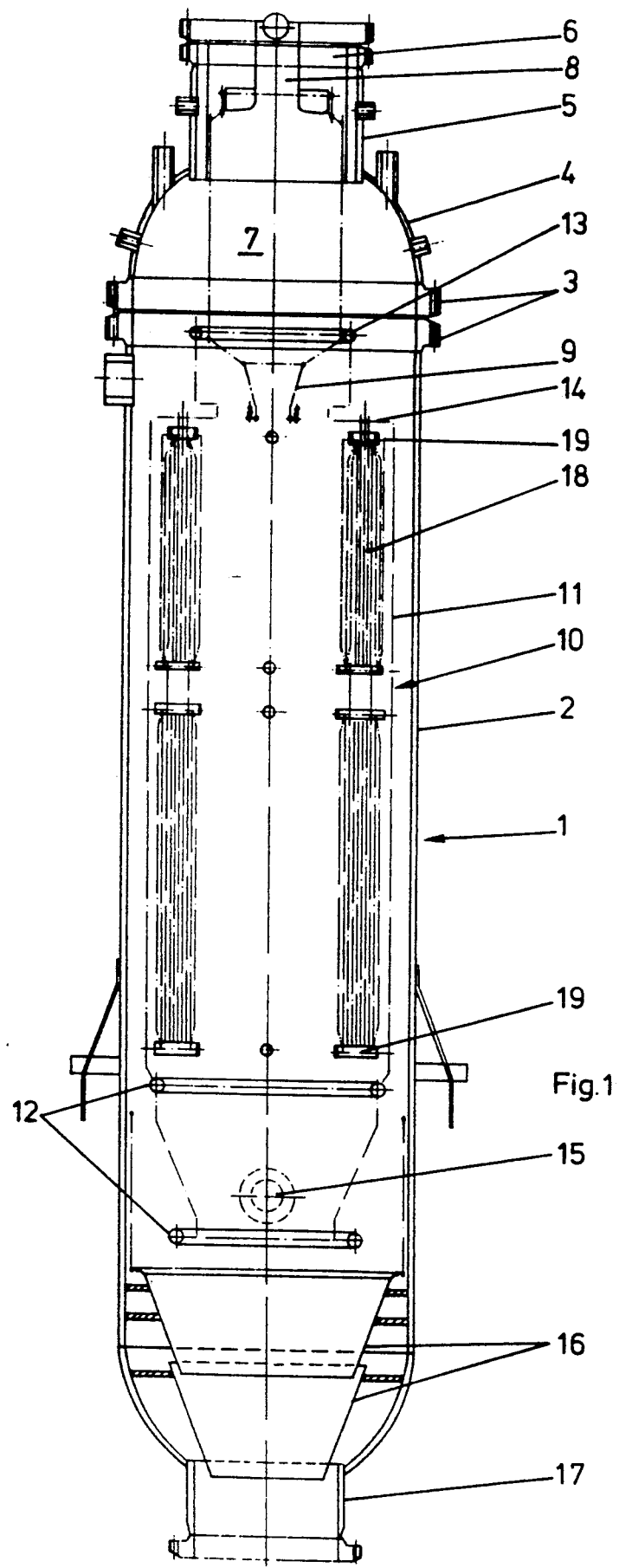
FIG. 1 is a longitudinal section through a device that comprises a gasification reactor and a cooler and FIG. 2 is a longitudinal section through the top of the device.
Figure 2:
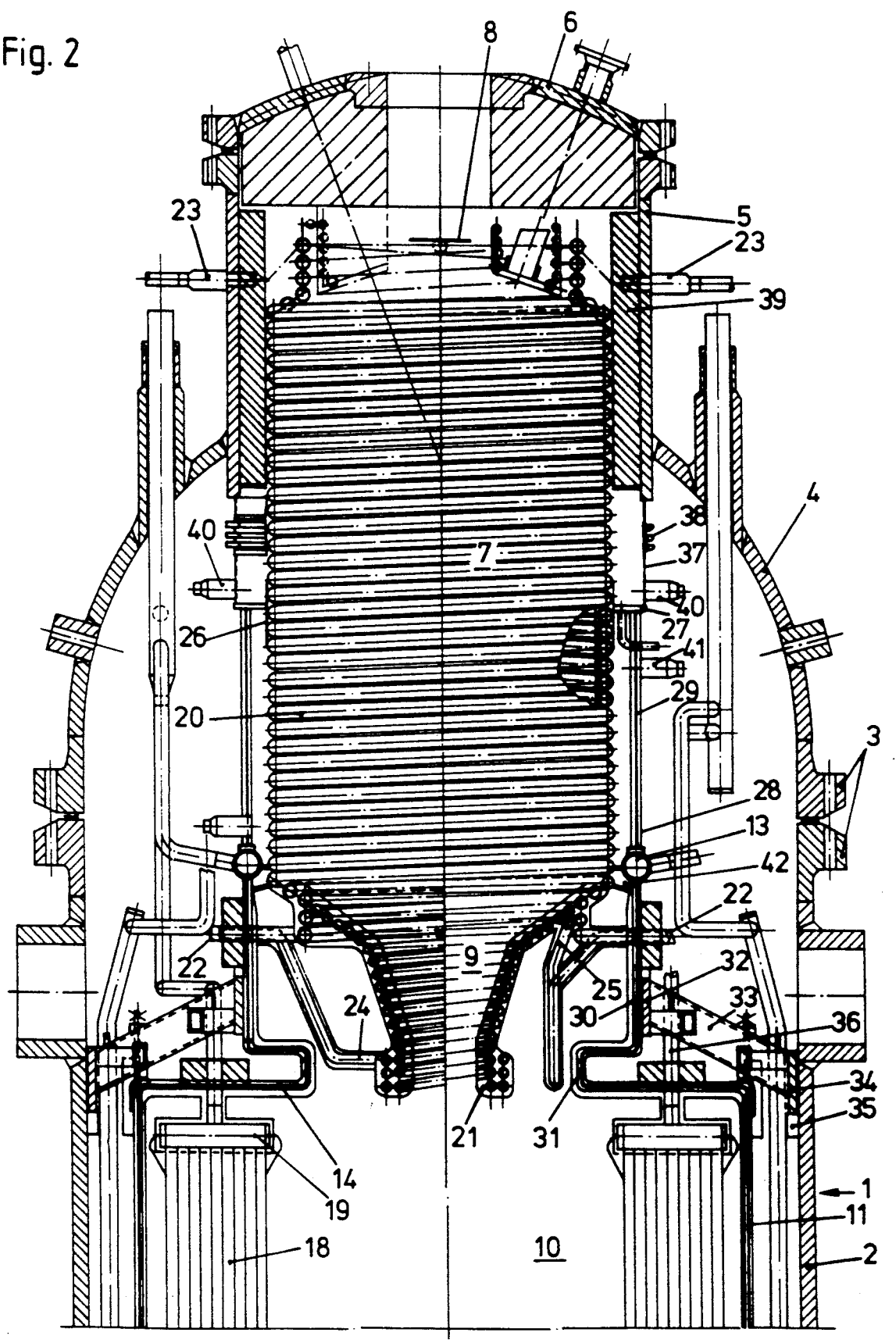

A vessel 1 consists of a cylindrical jacket 2 with a dome 4 flanged to it at a joint 3. The dome can be separated from the jacket. The vessel is pressurized to approximately 20 bars. Extending above the center of dome 4 is a welded-on neck 5. The neck has a lid 6.

A gasification reactor 7 is inserted into the top of vessel 1. The reactor is cylindrical and has at the top a mouth 8 that accommodates an unillustrated burner extending through lid 6. The bottom of reactor 7 is shaped like a funnel and constitutes an outlet 9 for product gas and slag. The extractor opens into a cooler 10.

Cooler 10 is a polygonal insert 11 separated from the inner surface of the jacket 2 of vessel 1. The insert is composed of vertical tubes connected by intermediate webs to form a gas-tight wall. The tubes that constitute the wall of insert 11 communicate by way of headers 12 and of an annular header 13 with a system for generating steam. The tubes that comprise the wall extend above insert 11 to form an annular roof 14. The narrower bottom end of insert 11 opens into vessel 1. A gas-extraction channel 15 is connected to the wall of insert 11 above its bottom edge and extends through the jacket 2 of vessel 1. Jacket 2 is protected below insert 11 by a slag cone 16 that opens into a slag-extraction connection 17 in the bottom of vessel 1.

At the edge of the insert 11 in cooler 10 are flat, bulkhead-like nests 18 of tubes that radiate from the longitudinal axis of cooler 10. Nests 18 communicate with upper and lower headers 19 and with the steam-generating system in insert 11 and are preferably distributed in the capacity of superheaters.

Reactor 7 consists of a cylindrical wall 20 of tubes lined with a refractory material 21. The tubes in the wall are coiled into a coil with many loops that are secured together. The tubes communicate by way of an intake 22 and an outlet 23 with a water-circulating system. The tubes that constitute conical outlet 9 communicate with a special circulating system that is separated from the system in the cylindrical section of wall 20 and has its own intake 24 and outlet 25. Separating the flows makes it possible to remove and replace just the lower section of reactor 7.

The outer surface of the wall 20 of reactor 7 is provided approximately half-way up with a reinforcing ring 26 secured to an annular support 27. Annular support 27 rests on a wall 28 that surrounds reactor 7 at a distance. Wall 28 rests as will now be described on the jacket 2 of vessel 1. The upper section 29 of wall 28 can be a sheet-metal cylinder resting on annular header 13. The inside diameter of the header equals the diameter of upper section 29. Below annular header 13, wall 28 extends into a lower section 30 in the form of a cylindrical wall made of tubes connected together gas-tight by webs. The diameter of lower section 30 also equals the inside diameter of annular header 13. Lower section 30 extends by way of an angled section 31 into annular roof 14 and into the side of insert 11. The result is a continuous wall of tubes that comprises lower section 30, angled section 31, and the annular roof 14 and side of insert 11. The tubes in this continuous wall communicate with annular header 13, which supplies it with medium.

It can be of advantage for the upper section 29 of wall 28 also to be made of tubes that equal those in lower section 30 in diameter and distribution. Nothing, however, flows through the tubes in section intake 29. Both walls can be manufactured in a single operation in the form of a cylinder that is then divided into radial planes.

Attached to lower section 30 is a ring 32, to which downward-sloping supports 33 distributed in the shape of a star are fastened. The other end of supports 33 is also attached to a ring 34 that rests on an annular support 35 secured to the inner surface of the jacket 2 of vessel 1. The flat nests 18 of tubes in cooler 10 are also suspended from supports 33 on supporting components 36 that extend through annular roof 14.

Once intake 22 and outlet 25 have been released and dome 4 removed, reactor 7 can be lifted off wall 28 and hence extracted separately from cooler 10 from vessel 1. Once reactor 7 has been extracted, wall 28 will remain in vessel 1 along with the insert 11 suspended from it and with the nests 18 suspended from supports 33. This assembly can likewise be removed from vessel 1 once its connecting lines have been disconnected.

The side of annular support 27 that faces away from wall 28 is connected to a cylindrical sheet-metal wall 37 that has an expansion joint 38 inserted in it. Sheet-metal wall 37 is secured to reactor 7 at the neck 5 around its upper section. Between neck 5 and the tube wall 20 of reactor 7 is a layer 39 of refractory material.

Sheet-metal wall 37 has one or more connections 40 for supplying an inert gas, preferably nitrogen. Since annular support 27 is sealed tight to the tube wall 20 of reactor 7 and to sheet-metal wall 37, the compressed inert gas flows up along the outer surface of tube wall 20. In the vicinity of the mouth 8 of reactor 7 are small-diameter perforations, through which the injected inert gas arrives inside reactor 7, ensuring a constant flow of inert gas.

Upper section 29 also has one or more connections 41 for supplying inert gas to the space between the tube wall 20 of reactor 7 and upper section 29. This space is sealed off with a plug 42 of refractory felt that is not gas tight between the tube wall 20 of reactor 7 and annular header 13. The compressed inert gas flows from the intermediate space into cooler 10 through plug 42. The gas protects the outer surface of the tube wall 20 of reactor 7 from corrosion from condensing water. The amount of inert gas consumed will also provide information about the condition of tube wall 20.

We claim:

1. An apparatus for gasifying pulverized, liquid, or gaseous materials containing carbon, comprising: a gasification reactor having a vertical tube wall with tubes, said tubes being constructed to provide for a coolant medium flowing through said tubes; said tube wall having an interior side lined with a refractory material; a cooler; said reactor having a downward-directed outlet extending into said cooler; said cooler comprising an insert of tubes constructed to provide for a coolant medium flowing through said tubes; a pressurized vessel holding said reactor and said cooler; a supporting wall vertically disposed and spaced from and surrounding said tube wall of said reactor; an annular support connected to said tube wall of said reactor and resting on said supporting wall; supporting elements holding said supporting wall against an inner wall of said vessel; means for connecting said cooler with said supporting wall; said reactor being separate from said cooler in said vessel, said reactor being supported on said supporting wall so as to be removable from said vessel independent of said cooler, said vessel remaining an integrally assembled unit upon removal of said reactor from said vessel.

2. An apparatus as defined in claim 1, wherein said reactor has a middle section, said annular support being connected to said middle section and resting on said supporting wall.

3. An apparatus as defined in claim 1, wherein at least a lower section of said supporting wall and said insert of said cooler are comprised of auxiliary tubes, said auxiliary tubes being constructed to provide for a coolant medium flowing through said auxiliary tubes; and webs connecting said auxiliary tubes so as to form a gas-tight tube wall.

4. An apparatus as defined in claim 1, including an annular header connected to an upper edge of a lower section of said supporting wall; an upper section resting on said annular header; said upper section being formed of a tube wall free of medium flowing therethrough.

5. An apparatus as defined in claim 1, including a sheet metal wall vertically disposed and spaced from said tube wall of said reactor; said sheet metal wall being connected to said supporting wall; and connecting means on said support wall and said sheet metal wall for supplying inert gas to a space between said supporting wall and said sheet metal wall and said tube wall of said reactor.

6. An arrangement as defined in claim 1, including a layer of refractory material surrounding at least a part of an outer surface of said tube wall.

7. An arrangement as defined in claim 1, wherein said downward-directed outlet is surrounded by a lower part of said tube wall, and means for flowing a coolant through said lower part of said tube wall separate from the rest of said tube wall.

8. An apparatus for gasifying pulverized, liquid, or gaseous materials containing carbon, comprising: a gasification reactor having a vertical tube wall with tubes, said tubes being constructed to provide for a coolant medium flowing through said tubes; said tube wall having an interior side lined with a refractory material; a cooler; said reactor having a downward-directed outlet extending into said cooler; said cooler comprising an insert of tubes constructed to provide for a coolant medium flowing through said tubes; a pressurized vessel holding said reactor and said cooler; a supporting wall vertically disposed and spaced from and surrounding said tube wall of said reactor; an annular support connected to said tube wall of said reactor and resting on said supporting wall; supporting elements holding said supporting wall against an inner wall of said vessel; means for connecting said cooler with said supporting wall; said reactor being separate from said cooler in said vessel, said reactor being supported on said supporting wall so as to be removable from said vessel independent of said cooler, said vessel remaining an integrally assembled unit upon removal of said reactor from said vessel; said reactor having a middle section, said annular support being connected to said middle section and resting on said supporting wall; at least a lower section of said supporting wall and said insert of said cooler being comprised of auxiliary tubes constructed to provide for a coolant medium flowing through said auxiliary tubes; webs connecting said auxiliary tubes so as to form a gas-tight tube wall; a sheet metal wall vertically disposed and spaced from said tube wall of said reactor; said sheet metal wall being connected to said supporting all; connecting means on said supporting wall and said sheet metal wall for supplying inert gas to a space between said supporting wall and said sheet metal wall and said tube wall of said reactor; a layer of refractory material surrounding at least a part of an outer surface of said tube wall; said downward-directed outlet being surrounded by a lower part of said tube wall, and means for flowing a coolant through said lower part of said tube wall separate from the rest of said tube wall.

* * * * *